US008516505B2

(12) United States Patent
Ergan et al.

(10) Patent No.: US 8,516,505 B2
(45) Date of Patent: Aug. 20, 2013

(54) CROSS-PLATFORM COMPATIBILITY FRAMEWORK FOR COMPUTER APPLICATIONS

(75) Inventors: Cenk Ergan, Bellevue, WA (US); Yuqing Li, Redmond, WA (US); Justin Steventon, Redmond, WA (US); Eric Kochhar, Mercer Island, WA (US); Nikhil Bhatia, Bellevue, WA (US); Udayasimha Shivaswamy, Sammamish, WA (US); Erik V. Day, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1301 days.

(21) Appl. No.: 12/048,626

(22) Filed: Mar. 14, 2008

(65) Prior Publication Data

US 2009/0235284 A1    Sep. 17, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/328; 719/331

(58) Field of Classification Search
None
See application file for complete search history.

(56) References Cited

U.S. PATENT DOCUMENTS

| | | | |
|---|---|---|---|
| 5,127,103 A | | 6/1992 | Hill et al. |
| 5,734,904 A * | | 3/1998 | Kanamori et al. ............ 719/331 |
| 6,182,158 B1 | | 1/2001 | Kougiouris et al. |
| 6,351,845 B1 * | | 2/2002 | Hinker et al. ................ 717/128 |
| 7,069,260 B2 | | 6/2006 | Yanosy |
| 7,103,666 B2 | | 9/2006 | Royer et al. |
| 8,255,919 B2 * | | 8/2012 | Beverly et al. ............... 718/105 |
| 2004/0015967 A1 | | 1/2004 | Morris |
| 2004/0111511 A1 | | 6/2004 | Maeda et al. |
| 2005/0022157 A1 * | | 1/2005 | Brendle et al. ............... 717/104 |
| 2005/0234787 A1 | | 10/2005 | Wallmeier et al. |
| 2006/0036570 A1 | | 2/2006 | Schaefer et al. |
| 2006/0281556 A1 * | | 12/2006 | Solomon et al. ............... 463/43 |
| 2007/0083655 A1 * | | 4/2007 | Pedersen ...................... 709/226 |
| 2007/0240147 A1 | | 10/2007 | Bernabeu-Auban et al. |
| 2007/0261048 A1 | | 11/2007 | Bernabeu-Auban et al. |

OTHER PUBLICATIONS

"Wow64", printed at http://book.itzero.com/read/microsoft/0507/microsoft.press.microsoft.windows.internals.fourth.edition.dec.2004.internal.fixed.ebook-ddu__html/0735619174/ch03 1evlsec8.html on Dec. 5, 2007, 5 pgs.
"Tales of Application Compatibility" printed at http://www.informit.com/content/images/9780321440303/samplechapter/Chen_bo-nus_ch01.pdf on Dec. 6, 2006, 51pgs.

* cited by examiner

*Primary Examiner* — Emerson Puente
*Assistant Examiner* — Kimbleann Verdi
(74) *Attorney, Agent, or Firm* — Chin IP, PLLC; David Chin (57) ABSTRACT

A computer with a platform that reduces cross-platform compatibility issues associated with executable computer components. A context for a component to be executed on a computer is detected. The context may be detected by searching metadata associated with the component and locating the context therein. If the context is not found in the metadata, then a context may be inferred in other ways, such as from a subsystem major/minor version. Execution of the component invokes one or more components of a computer operating system that provides a platform for executing operations that support execution of the component. Branch components present in the platform are used to select behaviors for the operations based at least in part on the detected context of the component. By providing a context-based selection from any of multiple targeted behaviors for an operation performed by the platform, cross-platform compatibility is improved.

20 Claims, 7 Drawing Sheets

CROSS-PLATFORM COMPATIBILITY FRAMEWORK FOR COMPUTER APPLICATIONS

BACKGROUND

As computer platforms (e.g., operating systems) evolve from version to version, changes are made to support new technology, to provide "bug" fixes for known problems, and to implement modifications in design strategy. However, changes to the implementation of underlying functions relied upon to support execution of applications may result in application compatibility problems. For example, potential conflicts and/or inconsistencies might arise when attempting to execute old versions of an application on a newer platform that implements a function with a behavior different than that provided when a prior version of the platform implemented the same function.

Several methods exist for mitigating application compatibility issues. For example, in a method called shimming, applications that do not work properly with a new platform are identified, and a workaround fix is generated for the specific application that was identified as broken. Shim fixes implement a form of application program interface (API) hooking, and they are implemented as alternative code that executes upon redirection of an API call from the normal execution of operations in the platform. Shim code is housed outside of the platform core, and is maintained separately. Essentially, shimming injects additional code into the application before it interfaces with operations running in the platform.

Shimming is a tool to allow software written by third party software vendors to work with new platforms. However, shimming has some noted limitations with regard to fixing application compatibility. For example, because shimming executes in user-mode, shim code cannot be written to fix compatibility issues with kernel-mode code, such as interfaces of the application with device drivers, or other code that runs in kernel mode (e.g., some anti-virus, firewall, and anti-spyware code). Additionally, fixing compatibility issues for all applications executing on a platform with shim code is difficult, because the developer writing the shim code may not be aware of all applications being executed on the platform. Also, because shim code must be written for each application that is identified as incompatible, the shimming infrastructure suffers from a scalability standpoint.

Another method used to address application compatibility is versioning. In versioning, "broken components" are identified, and a component that keeps the old behaviors of old platform is created in the new platform. In places where the application can use the functionality of new components of the new platform, explicit links are made between the application code and the supporting components in the new platform. However, like shimming, versioning also suffers from scalability problems, as each place in the application code where links between the application code and new platform component functionality might exist must be identified and created.

Yet another method of supporting application compatibility is virtualization. In virtualization, the old platform and the new platform are run side-by side. In this way, applications that rely on old behaviors of the old platform may run using the old platform, while applications that have incorporated features to use aspects of the new platform are able to take advantage of those aspects. Virtualization however, is not void of difficulties when it comes to application compatibility. For example, integration and sensing of which applications should run on which platform, as well as how to share information between the virtual environment and the native environment may not be straightforward. Additionally, systems that employ virtualization necessarily must update and maintain both platforms, which can sometimes lead to conflicts when upgrading and/or updating the platforms using software patches (e.g., security updates).

SUMMARY OF INVENTION

In developing new versions of a computer software application to execute on a new platform, innovations are typically incorporated into various aspects of the application that are configured to take advantage of changes to the behavior of operations supported by the new platform. However, other aspects of the application may remain dependent on old behaviors of operations supported by a platform for which the application was previously designed to execute on. Applicants have recognized and appreciated that previous approaches in mitigating cross-platform compatibility are sometimes unsatisfactory. In an effort to address these difficulties, embodiments of the invention disclose methods and apparatus for a framework in which a selection from multiple behaviors can be made based on a context of a component to be executed on a computer.

The context provides an indication of the platform and/or expected behaviors of the platform for which the component was developed. The context may be detected based on the version of the component to be executed, from the platform on which the component was designed to execute, or by any other suitable means. For example, in some embodiments, the component executing on a computer may be an application, and the platform on which the application was designed to execute may be a particular release of a computer operating system. The context of the application may be detected by searching metadata associated with the application for the context. The metadata may be included in a metadata file associated with the application, or be associated with the application in some other manner, such as in a header of an executable file associated with the application, or in multiple files associated with the application. In the absence of finding an indication of the context in the metadata, the context may be derived from the subsystem major/minor version, which specifies the minimum operating system on which the application can be executed.

In some embodiments, the application context, once determined, may be sent to, or requested by, other components executing on the computer, including components of the computer operating system. Components of the computer operating system, when executed, may yield operations with behaviors that support the execution of the application. Furthermore, components of the computer operating system may comprise at least one branch component that select between one or more functions providing alternative behaviors for an operation based at least in part on the application context.

In addition to selecting between alternative behaviors, a branch component may additionally comprise one or more components that serve other functions as well. For example, a branch component may comprise a reporting module and/or a logging module to track changes in the usage of components by various users at remote locations and report the usage changes to a central authority for analysis (i.e., telemetry). Alternatively, the reporting module and/or logging module may be used during the application development process to track the execution of application code at runtime (i.e., tracing).

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that the cross-platform compatibility of computer executable components may be improved by providing a framework in which the behaviors of supporting operations in a platform are determined based on the context of the component being executed. By providing platform developers with a structured framework for mitigating cross-platform compatibility, code changes in new platforms can be isolated and separate code with distinct behaviors can be implemented for each supported platform at the isolated code change location. This targeted approach focuses on improving application compatibility by selecting between behaviors at strategic, well-defined, and testable boundaries in the platform, and allows for improved scalability and high out-of-box compatibility for many applications.

Figure 1:
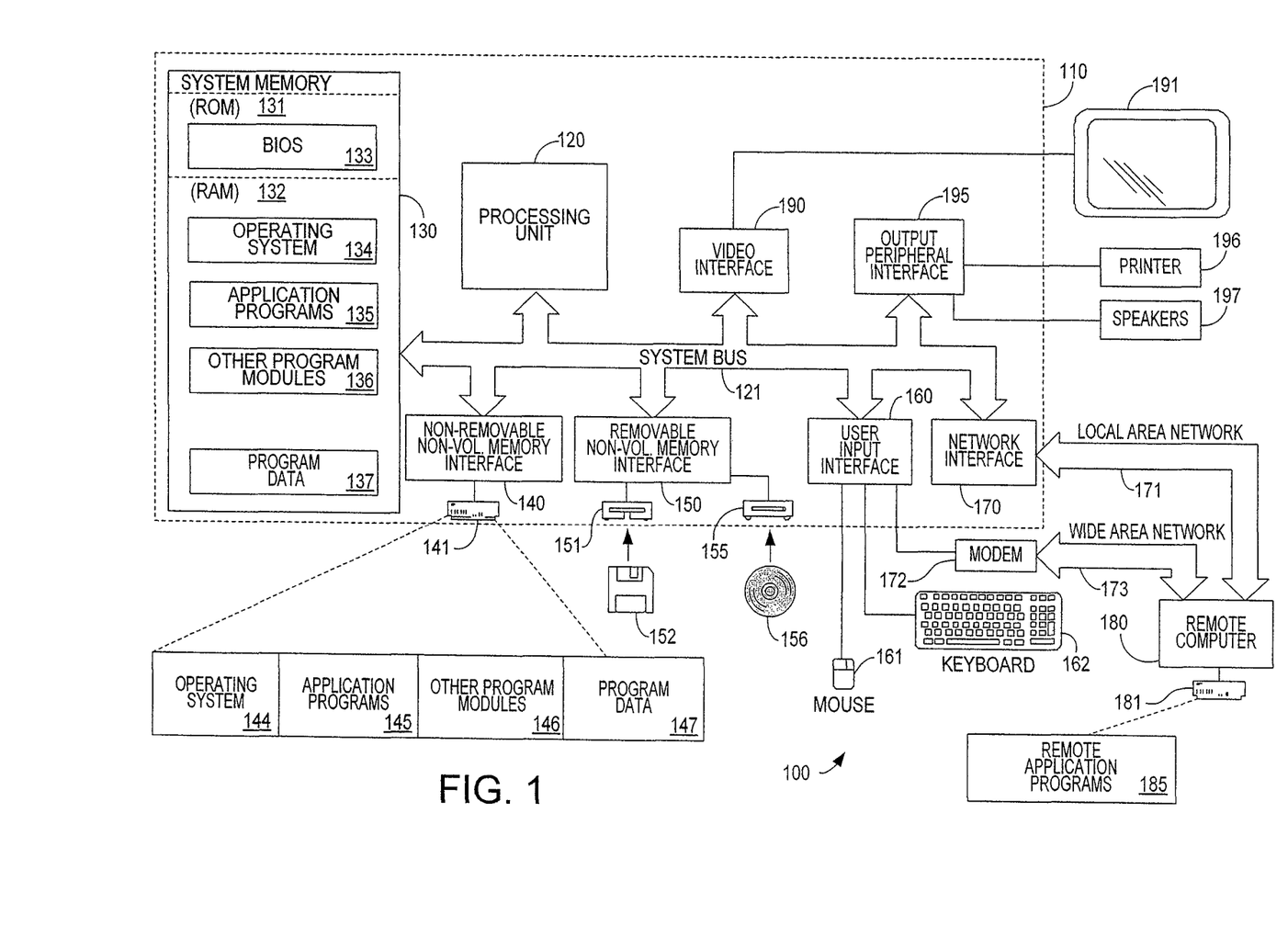
FIG. 1 is a diagram of a computing device on which various embodiments of the invention may executed.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing embodiments of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
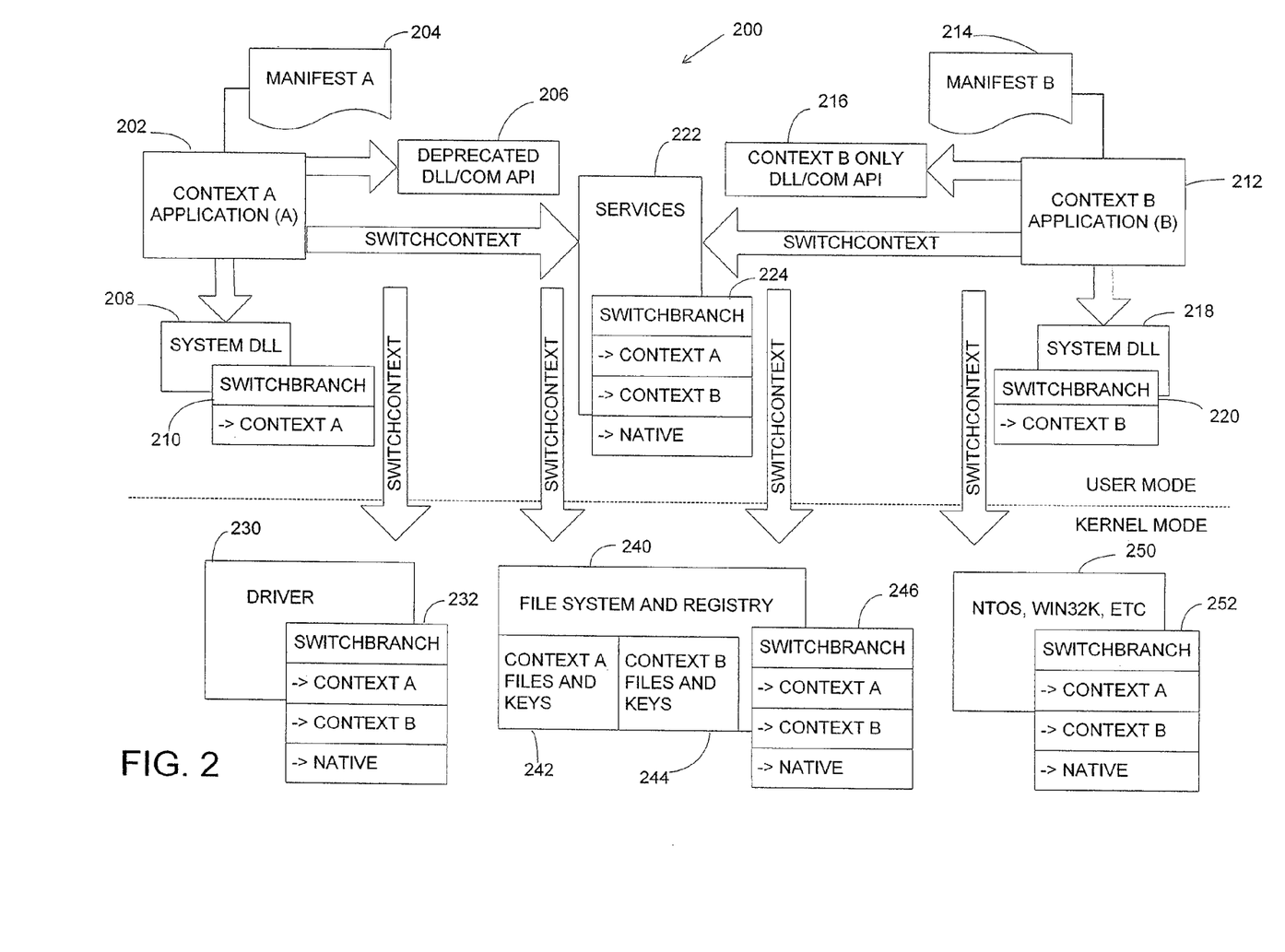
FIG. 2 is a schematic of a software architecture for implementing various embodiments of the invention.

Embodiments of the invention may be implemented using a software architecture 200 shown in FIG. 2. The architecture may include one or more applications such as applications 202 and 212 selected to execute on the computer 110. Each application may have been designed for execution on a particular platform. For example, the platform may be a version of a computer operating system, which contains various components, such as the components (other than application components 202 and 212) shown in FIG. 2. While an application may have been designed to execute on a particular platform, the application may execute on other platforms as well, which have components that provide similar behaviors.

Such a scenario occurs, for example, when an application component is developed to execute on a particular version of a platform and relies on the platform performing certain operations in certain ways. However, a user may wish to execute that same application component on a later version of the same platform. That later version may perform the same operations as the prior version, but may exhibit one or more different behaviors, in comparison to the prior version of the platform.

To reduce such compatibility issues, the software architecture 200 implements a novel branch component for selecting a behavior for an operation in a platform based on the context of a component, such as an application. Specifically, the context may provide insight into the platforms on which the component is designed to execute. The branch component (i.e., SwitchBranch) may be inserted into platform components at strategic locations, to provide one or more behaviors that depend on the context of the executing component.

One way to determine which platforms an application may execute properly on is to examine the application's application manifest. Each application may have an associated application manifest such as manifests 204 and 214. An application manifest is a store of data relating to an application and may be implemented as an XML file that describes and identifies shared and private side-by-side assemblies that an application should bind to at run time. For example, an application manifest may describe application components, such as dynamic-link libraries (DLLs), files, window classes, component object model (COM) servers, type libraries, interfaces, or any other assemblies. In addition, application manifests may describe metadata for files that are private to the application. The metadata may comprise, among other things, an application context, indicating the version of the application and/or the platform(s) on which the application was developed to execute. Information in the manifest may help to identify a context for the application. In the example shown in FIG. 2, it may be determined that application 202 has a context A, and application 212 has a context B. The context A may indicate that application 202 was developed to execute with an older version of a platform than application 212. Though, as described below, other mechanisms are possible for determining the context for a component.

Each application may reference one or more shared library (e.g., DLL) or COM application component interfaces (APIs) that may be application context specific. For example, the application 212 may reference a DLL/COM API 216 that is specific to its application context. As such, application 212 with a context B may reference a DLL/COM API 216 also having a context B. Applications may also reference platform components, such as various system level DLLs, and the system DLLs may also be compatible only with a particular context. For example, the application 212 may reference a system DLL 218 having the context B, and the application 202 may reference a different system DLL 208 having the context A.

In one embodiment, a dynamic context value may be maintained for each process (e.g., application) as part of the computer's execution environment. The dynamic context value may be adjusted at run-time based on the loaded components in the process address space. The dynamic context may reflect the lowest context value among all components in the process. The initial value of the dynamic context may be set to the context determined during process creation time. The value of the dynamic context may then be adjusted at run-time when a component is loaded or unloaded in the process. For example, upon execution of a process with context A, the dynamic context value may be set to context A. When an extension/DLL with context B is loaded, the dynamic context may be switched to context B if context B is a lower context value than context A. When the extension with context B is unloaded, the dynamic context value may be switched back to context A.

Applications may call one or more services 222 that interface with the application, and at least one of the services 222 may incorporate a SwitchBranch 224. For example, when a new application is added to the computer system 110, the application may call an installer service (e.g., Windows Installer from Microsoft Corporation) to facilitate the installation process. Insertion of SwitchBranch 224 into, for example, an installer service 222, allows invoked installer components to provide different behaviors depending on the context of the calling application. With reference to FIG. 2, if an installer service 222 is called by application 202, then SwitchBranch 224 will select the use of behaviors consistent with context A when invoking platform components to support the installation of application 202. In contrast, if the same installer service 222 is called by application 212, then Switch-Branch 220 will select the use of behaviors consistent with context B when invoking platform components to facilitate the installation of application 212.

While some branch components may support multiple contexts such as the SwitchBranch 224, other SwitchBranches (e.g., SwitchBranches 210 and 220) only support one context. For example, the system DLL 208 which is referenced by the application 202 may include a SwitchBranch 210 for selecting between contexts supported by the system DLL 208. In this example, SwitchBranch 210 indicates that only context A is supported by the system DLL 208, and therefore only behaviors corresponding to context A used. Similarly, system DLL 218 which is referenced by application 212 may contain a SwitchBranch 220 which indicates that only context B is supported. Accordingly, only behaviors compatible with context B are used in this situation.

In some instances, a SwitchBranch may only have one specified context, and this may occur for various reasons. For example, because they have the same context, system DLL 208 will work properly when called by application 202. However, if called by application 212, which has the context B, system DLL 208 will report an error because the contexts do not match. Therefore, in some cases a SwitchBranch may be implemented with a single context to facilitate compatibility between a component such as a DLL/COM API 206 or 216 and an application. In other cases, the SwitchBranch may be used to prevent certain applications from calling components that are incompatible with the calling application. According to one embodiment of the invention, designing Switch-Branches to essentially hide functionality from certain applications, a practice known as concealment, may provide motivation for application programmers to design new applications and/or update pre-existing applications to be able to integrate the functionality that would be otherwise hidden if the application relied only on old behaviors.

Yet other applications (not shown) may be designed to execute using "Native" context, where, for example, contexts A and B refer to earlier versions of a platform, and Native context refers to the current version of a platform. Unlike applications developed for execution in earlier versions of a platform (e.g., contexts A and B), applications designed to use a Native context may take advantage of the most recently developed behaviors of operations in a platform.

The foregoing description of software architecture 200 has focused on various application and platform components residing within the user mode layer of the architecture. Applications in user mode typically do not directly interact with the kernel, the memory or the hardware. In this way, components executing in user mode are heavily restricted, but doing so makes it less likely that such user mode components (e.g., applications) will cause a system failure. However, components executing in user mode such as system DLLs 208 and 218, or services 222 periodically require access to kernel mode components.

Components executing in kernel mode have fewer restrictions than components in user mode, and kernel mode components typically run as background processes to make sure everything runs smoothly. Examples of kernel mode components include but are not limited to, device drivers 230, such as printer drivers, display drivers, or input device drivers (mouse, keyboard, etc,), file system and registry components 240, and core kernel source and management components 250 (e.g., NTOS, Win32K, etc.).

The behavior of kernel mode components may also change across different versions of a platform. Therefore, one or more branch components may also be incorporated into kernel mode components to allow for selection between various behaviors based on information about an executing component's (e.g., application's) context. Applications typically execute in user mode, and information about an application's context is transmitted from an application component in user mode to kernel mode components in any suitable way. For example, an application may transmit its context automatically to a kernel mode component that it calls, by providing the context information in a header file, or in some other form of associated data accompanying the call. Alternatively, a kernel mode component may send a request to a calling application for the application's context, and in response to the request, the application context may be transmitted to the kernel mode component. In yet another alternative, the kernel mode component may acquire information about the context of an executing application though indirect means. For example, when executed, an application may invoke several kernel mode processes or threads, some, or all of which, may desire information about the application's context. Instead of requesting the context directly from the application, some kernel mode components may receive information about an application's context from various active kernel mode processes or subprocesses invoked by the application. Regardless of the way in which a kernel mode component receives information about an executing component's context, kernel mode components may employ SwitchBranches in a similar manner as user mode components.

In one embodiment of the invention, a device driver 230 may include a SwitchBranch 232 for selecting between different behaviors depending on the context of the component that called the driver. For example if the system DLL 208 called the driver 230, then SwitchBranch 232 may select a behavior consistent with context A to be implemented, whereas, if system DLL 218 called the driver 230, then SwitchBranch 232 may select a behavior consistent with context B to be implemented. Alternatively, if the call to the driver 230 was from a service 222, such as an installer service as mentioned previously, the context determined for the service 222 may be passed to the driver 230 and used in the SwitchBranch 232 to select the appropriate behavior.

In one embodiment of the invention, components of the file system and registry 240 may also include one or more Switch-Branches (e.g., SwitchBranch 246) for selecting between different behaviors based on the context of a calling component. Additionally, the file system and registry may contain files and/or keys that are specific to a particular context (e.g., blocks 242 and 244 in FIG. 2). In one implementation, SwitchBranch 246 may be used to determine which files and/or keys can be accessed by a calling component. For example, if an application that calls an installer service is launched, the installer service may check for the existence of critical files or registry keys. If there is a mismatch between the current system state and the value specified in the application's installer package, then the related feature may be re-installed. In order to perform these operations effectively, the file system and registry 240 should know the context of the application that is being installed, and the appropriate behaviors should be selected by SwitchBranch 246, such that only the files and keys corresponding to the desired context are accessed and checked.

Similarly, in other embodiments of the invention, kernel source code and/or standard APIs as shown in block 250 of FIG. 2 may be called from various components. A Switch-Branch 252 inserted into one or more components in block 250 facilitates at least partial system virtualization, such that applications executing in particular contexts can leverage functionality of the core features of the platform version on which the application was designed to execute.

It should be appreciated that other components not shown in FIG. 2, may also be included as part of the software architecture 200 with which embodiments of the invention may be implemented, and embodiments of the invention are not limited in this respect. Additionally, SwitchBranches may be included in other components and/or other places in the software architecture 200, and embodiments of the invention are not limited in this respect.

Figure 3:
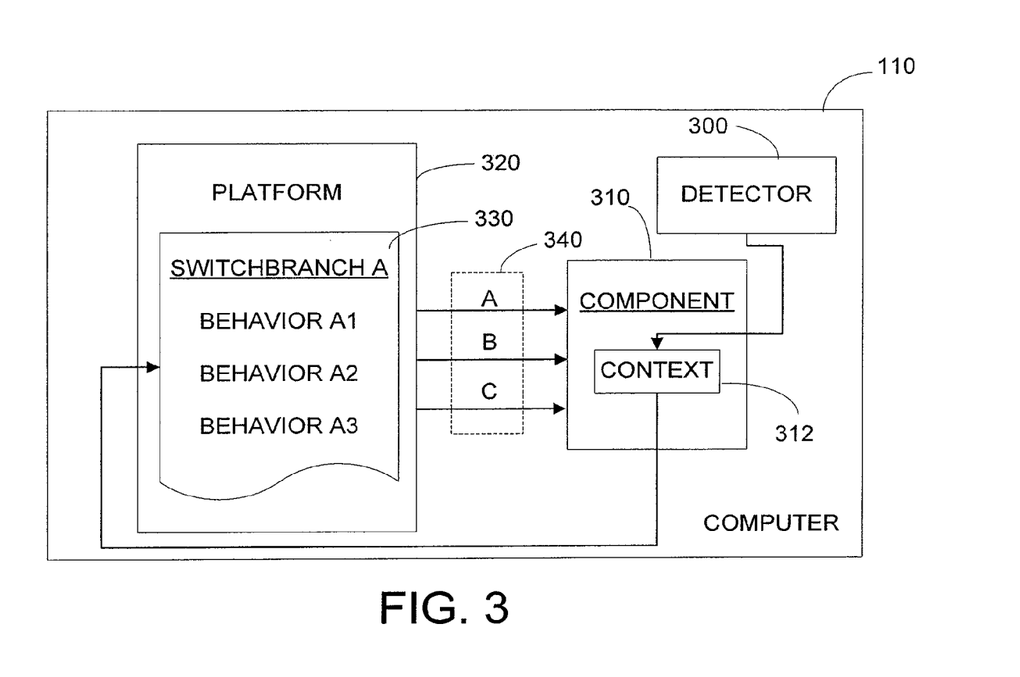
FIG. 3 is a schematic showing an implementation of a branch component according to an embodiment of the invention.

The implementation of a SwitchBranch according to various embodiments of the invention will now be described with reference to FIGS. 3 and 4. A detector module 300 may be used to determine the context 312 of a component 310 executing on the computer 110. The component may, for example, be an application 362 as described above, or may be any other suitable executable component, including, but not limited to, plug-ins, add-ins, applets, widgets, gadgets, or any other component that executes on a platform (e.g., JAVA, .NET) that is different than the computer operating system, and thus only communicates with the operating system indirectly. In embodiments of the invention where the executable component indirectly communicates with the operating system, the context of the executing component may be recorded and stored in a location, so that the component's context may be made accessible to a SwitchBranch either directly or indirectly. In the examples provided below, the executing component is an application; however it should be appreciated that any suitable component, including, but not limited to, those components described above, may be employed, and embodiments of the invention are not limited in this respect.

After a determination of the application context 312, information related to the context may be made available to one or more other modules, at least one of which comprises a platform 320 for executing operations 340 that support the execution of the component 310. Application context information may be made available to various modules in one of several ways, and embodiments of the invention are not limited in this respect. As one example, the information may be passed to another module as a parameter of an API, such as the API 400 shown in FIG. 4. However, other mechanisms of making context information available are also possible and any suitable mechanism may be used. For example, context may be recorded in a registry or other storage location associated with a component or process in which the component executes, such that the application context can be retrieved from the storage location rather than from the application directly.

The platform 320 comprises at least one branch component 330 (i.e., SwitchBranch) for selecting a behavior for an operation 340 based at least in part on the application context 312. In an embodiment of the invention shown in FIG. 3, the SwitchBranch 330 is used for selecting between multiple behaviors for the operation A that supports execution of the component 310. The appropriate behavior for the operation A (i.e., behavior A1, behavior A2, or behavior A3) is selected based on the context 312 of the component 310 executing on the computer 110. While only three behaviors (A1, A2, A3) are shown in FIG. 3, embodiments of the invention are not limited in this respect, and any suitable number of behaviors, including only one behavior, may be present in SwitchBranch 330 for selection based on the context 312. By way of example, SwitchBranch 330 is used for selecting a behavior for an operation A. It should be appreciated that other Switch-Branches (not shown) may be implemented in the platform for selecting between alternative behaviors for operations B, C, or any other operations 340 that execute in the platform module 320 and support the execution of the component 310.

Figure 4:
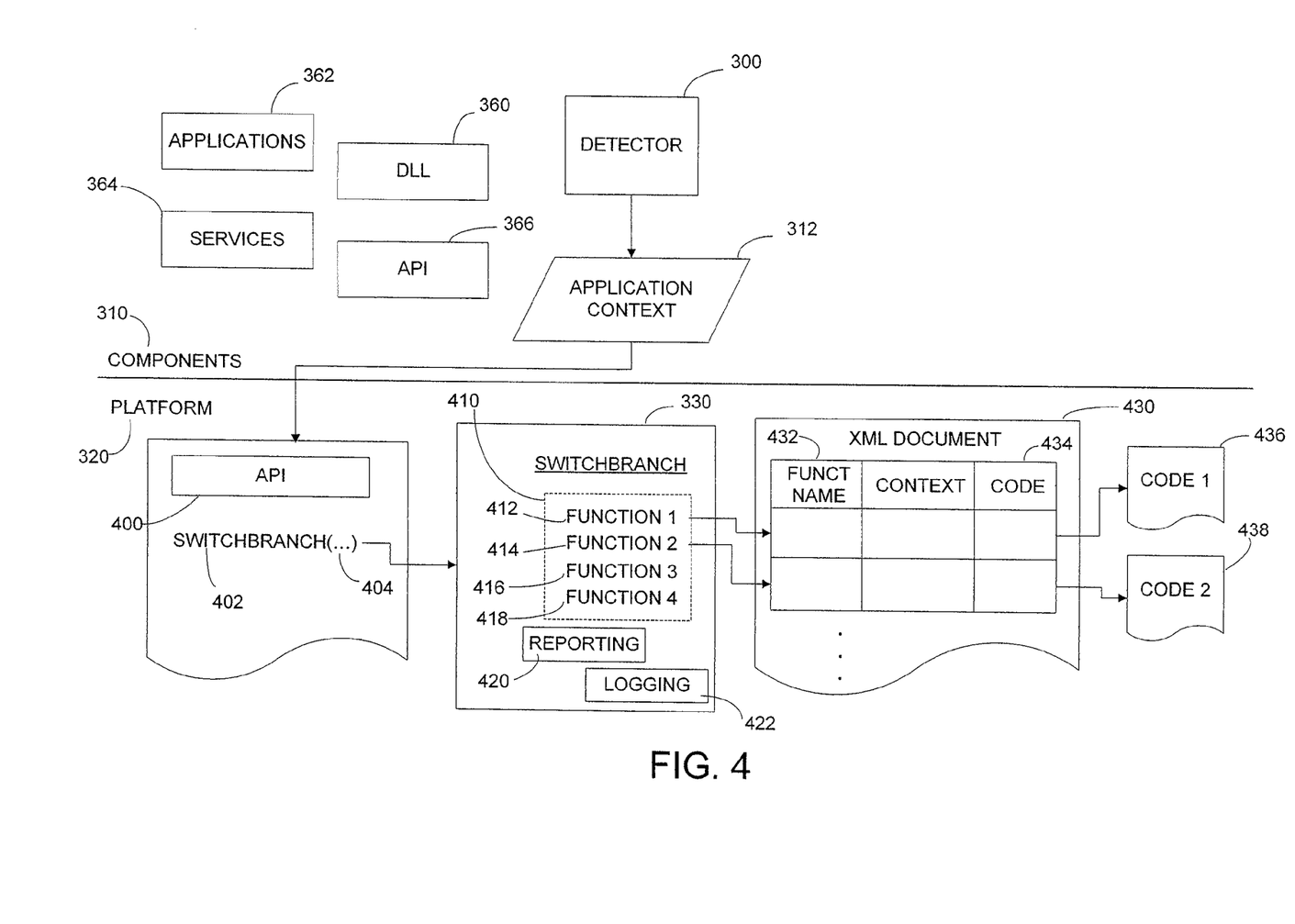
FIG. 4 is a schematic showing an another implementation of a branch component according to an embodiment of the invention.

With reference to FIG. 4, an embodiment of the invention may pass the application context 312 to SwitchBranch 330 via an API 400, through which a platform operation residing within the platform 320 is invoked. The API 400 may call a SwitchBranch routine 402, and information related to the application context 312 may be passed as one or more arguments 404 to the SwitchBranch routine 402. The Switch-Branch routine 402, inserted as computer code into a component of the platform 320 may execute a series of instructions that perform the method of selecting computer executable instructions that perform the invoked operation with behavior based on the context. The computer executable instructions as illustrated in FIG. 4 may be implemented as one or more functions 412, each function corresponding to a different behavior. The SwitchBranch 330 may select between the functions 412, 414, 416, and 418 that provide corresponding behaviors (e.g., behaviors A1, A2, A3, and A4) for an operation 340 that supports the execution of the component 310. It should be appreciated that any suitable method may be implemented by the SwitchBranch 330 to select code for execution based on the application context 312, and embodiments of the invention are not limited in this respect. It should also be appreciated that the context 310 may include DLL 360, applications 362, services 364, and/or API 366.

According to an embodiment of the invention, a selection of a desired function 410 based at least in part on the context 312 provided as arguments 404 to the SwitchBranch routine 402, results in execution of computer code (i.e., blocks 436 and 438) that provides the desired behavior. In one embodiment of the invention, a desired function (e.g., function 412), selected based on the application context 312, is mapped via an XML document 430 to the appropriate section of computer code (e.g., block 436) to execute the desired behavior. In one implementation, the XML document 430 corresponds to at least a portion of the application manifest associated with the executing application. As shown in FIG. 4, the XML document 430 may comprise a mapping of function names 432, corresponding to the functions 412, 414, 416, and 418 in the SwitchBranch 330, to pointers 434 to code segments, with the mapping being mediated by the application context 312 provided to the SwitchBranch 330. In some implementations, more than one application context 312 may map to the same function in a SwitchBranch 330, and embodiments of the invention are not limited in this respect.

In other aspects of the invention, a SwitchBranch 330 may be implemented as a module to perform additional functions that take advantage of the fact that SwitchBranches may be inserted by platform developers at strategic, well-defined, and testable boundaries in the platform. As such, at least a portion of the code within a SwitchBranch executes every time that the SwitchBranch is entered. The strategic placement of SwitchBranches in targeted components of the platform, provides a mechanism by which the performance of the targeted components may be uniformly characterized. The performance of the targeted components may be characterized in any suitable way, including, but not limited to, determining component usage.

For example, a SwitchBranch 330 may comprise a reporting module 420 and a logging module 422 that are used to facilitate uniform tracking of reported errors from customer machines, the rate of adoption of new features, or the need to support old behaviors. In one instance, the feedback provided by the performance tracking (i.e., via telemetry) may provide a basis for relegating some seldom used behaviors and their corresponding platform components to deprecated status in a future version of the platform, whereas other, more frequently used behaviors, may remain unchanged. It should be appreciated that the reporting module 420 and logging module 422 may be employed to track performance of a platform component in any suitable way. For example, the reporting module 420 may record the current state of events on a computer each time a SwitchBranch 330 is invoked. The events may comprise configuration information, information describing other active processes or threads, or any other information related to components executing on the computer at the time of a call to the Switch Branch. Furthermore, the recorded events may be stored using the logging module 422 in a log file, a registry, or any other storage location, and embodiments of the invention are not limited in this respect.

One way in which uniform tracking may be accomplished according to an embodiment of the invention is as follows. An application executing on a computer 110 periodically calls an API 400 within a platform component containing a Switch-Branch 330, to execute an operation that supports the execution of the application. During each execution of the Switch-Branch 330 for a platform component, one or more events, specifying a present state of the computer, are recorded to a log file in the logging module 422. Upon experiencing an application failure, the contents of log file, may be transmitted from the computer on which the application was executing to another computer for analysis, and to determine which processes were executing on the computer at the time of the application failure. Collecting and analyzing data from recorded during calls to SwitchBranches that are located at predictable and testable boundaries within the platform may enable uniform tracking of computer operating conditions prior to application failures. Such uniform tracking may lead to improvements in providing solutions targeted at the root cause of the errors, rather than trying to develop separate workaround patches for each error that is discovered.

Figure 5:
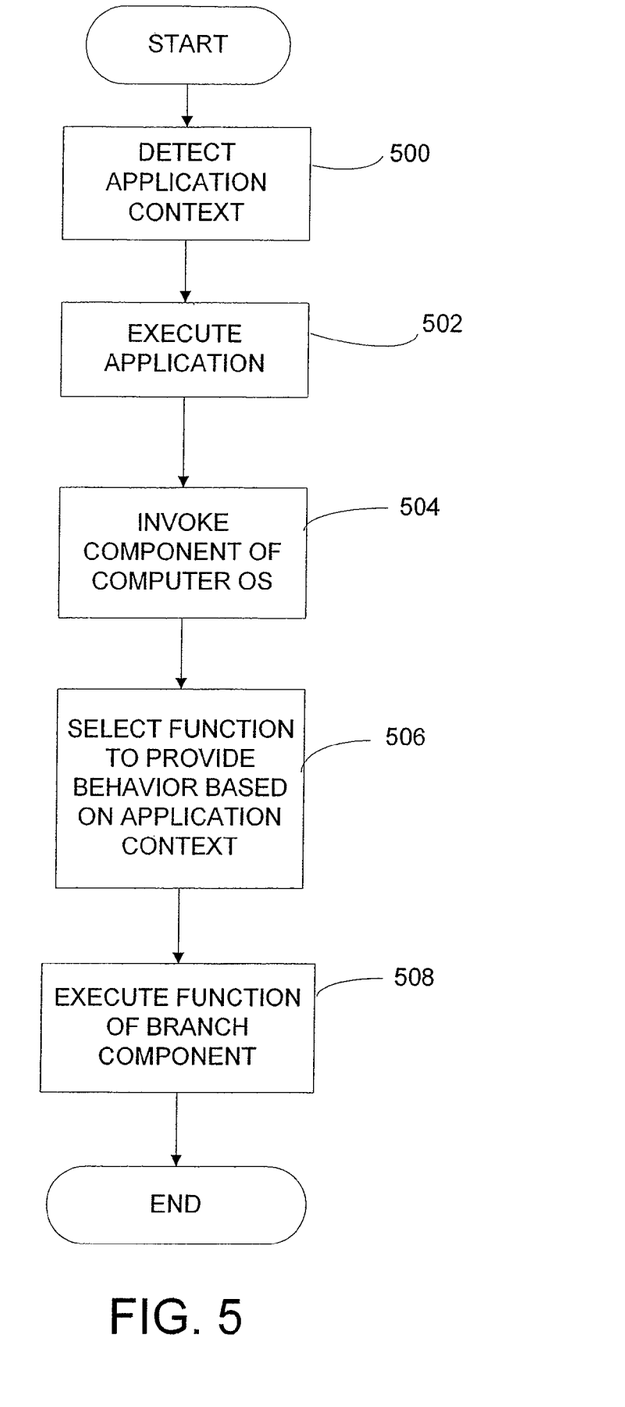
FIG. 5 is a flowchart of a process for modifying a behavior of a function based on an application context according to an embodiment of the invention.

FIG. 5 illustrates a process for facilitating software compatibility implemented using at least some of the architectures described above for one embodiment of the invention. At block 500, an application context is detected for an application to be executed on a computer. Context detection may be performed in any suitable way, and illustrative methods for detecting the application context will be described below with reference to FIG. 6. At block 502, the application is executed on the computer. Upon execution of the application, a component of the computer operating system (i.e., platform) comprising at least one branch component (i.e., SwitchBranch), is invoked at block 504. The invoked component of the computer operating system may be any component, such as those mentioned above (i.e., DLL, device driver, file system and registry, etc.), and others. When execution in the platform component has reached a point at which a context-based behavior is desired, a function is selected at block 506 in a branch component, wherein the function comprises computer executable instructions for providing the desired behavior. The selection of the appropriate function at block 506 is based at least in part on the application context determined at block 500. At block 508, the selected function is executed, thereby providing the desired behavior for an operation used to support the execution of the application.

Figure 6:
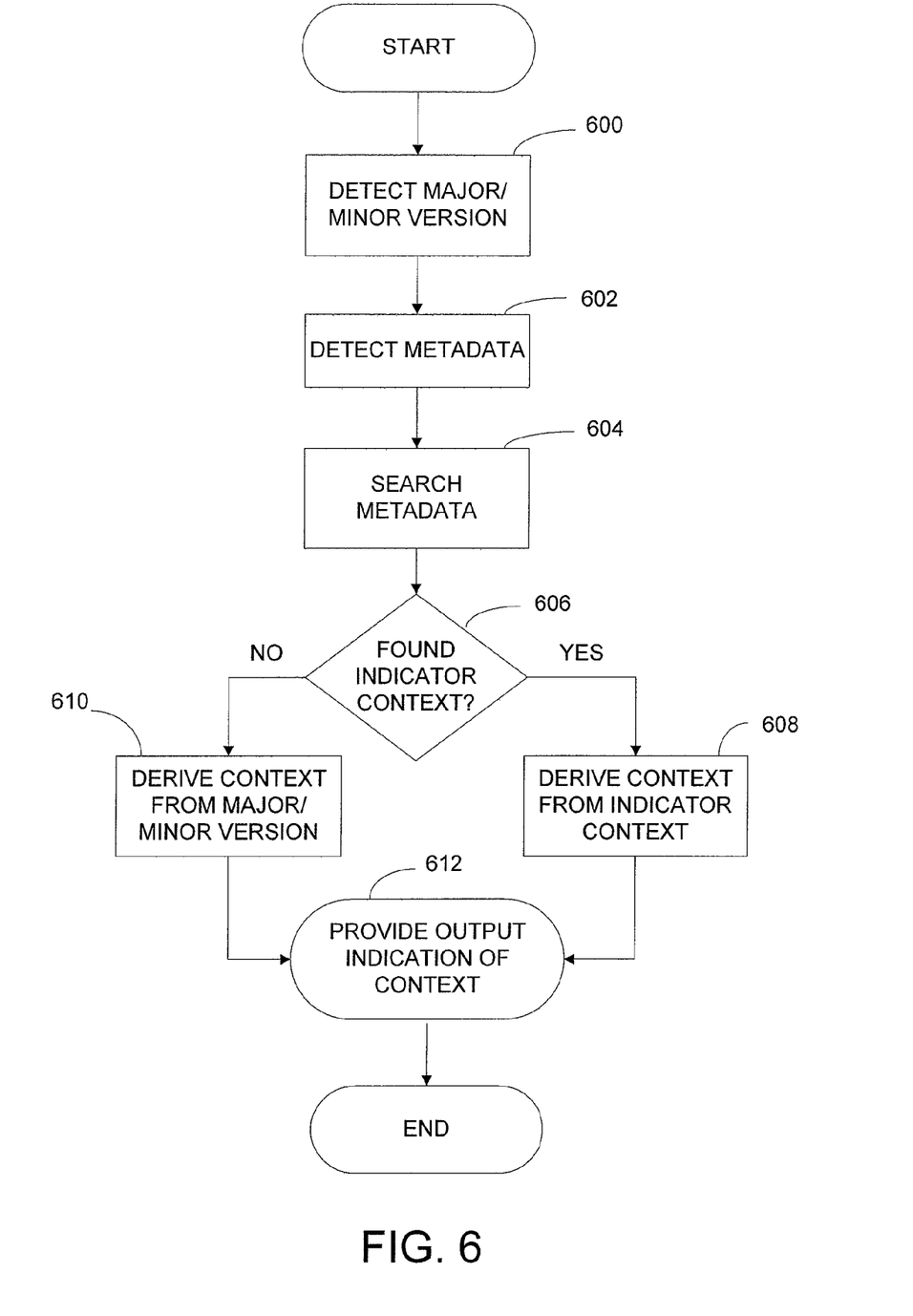
FIG. 6 is a flowchart of a process for detecting a context of a component according to an embodiment of the invention.

FIG. 6 illustrates a process for detecting a context from a component in a computer system according to one embodiment of the invention. Upon launch of the application, a subsystem major/minor version is detected at block 600. The subsystem major/minor version may be represented in any suitable way. For example, the subsystem major/minor version may be indicated in a header file associated with an application, or the subsystem major/minor version may be marked as a tag associated with the file. The subsystem major/minor version specifies the minimum operating system with which the application will function properly.

At block 602, it is determined whether or not the application has associated metadata. For example, the metadata may correspond to an application manifest as described previously. As mentioned previously, the application manifest may be created by an application developer, and may contain configuration information related to how the application is intended to interface with various components of the computer operating system. In some instances, an application manifest or other metadata may not exist for each application. In other instances, even though an application manifest exists, the application context information may not exist in any metadata in the manifest.

At block 604, the metadata is searched to locate indicator context information, which indicates the one or more platforms which the application supports. If the indicator context was not found in the metadata at decision block 606, the process proceeds to block 610, and the context is derived from the subsystem major/minor version detected at block 600. Otherwise, if the indicator context was found in the metadata, then the process proceeds to block 608, and the context is derived from the indicator context specified in the metadata. Upon determination of the context at either block 608 or 610, an indication of the application context is output at block 612.

In some instances, the application may be able to execute on multiple platforms, and a choice must be made to determine the desired context. In one embodiment of the invention, the version of the operating system for which the application was designed may be used to derive the desired context. In other embodiments, both the version of the application and one or more versions of the operating system on which the application may properly execute are considered and a set of heuristics are employed to derive the desired context. The aforementioned processes for detecting an application context are provided for illustrative purposes, and the invention is not limited in this regard.

Figure 7:
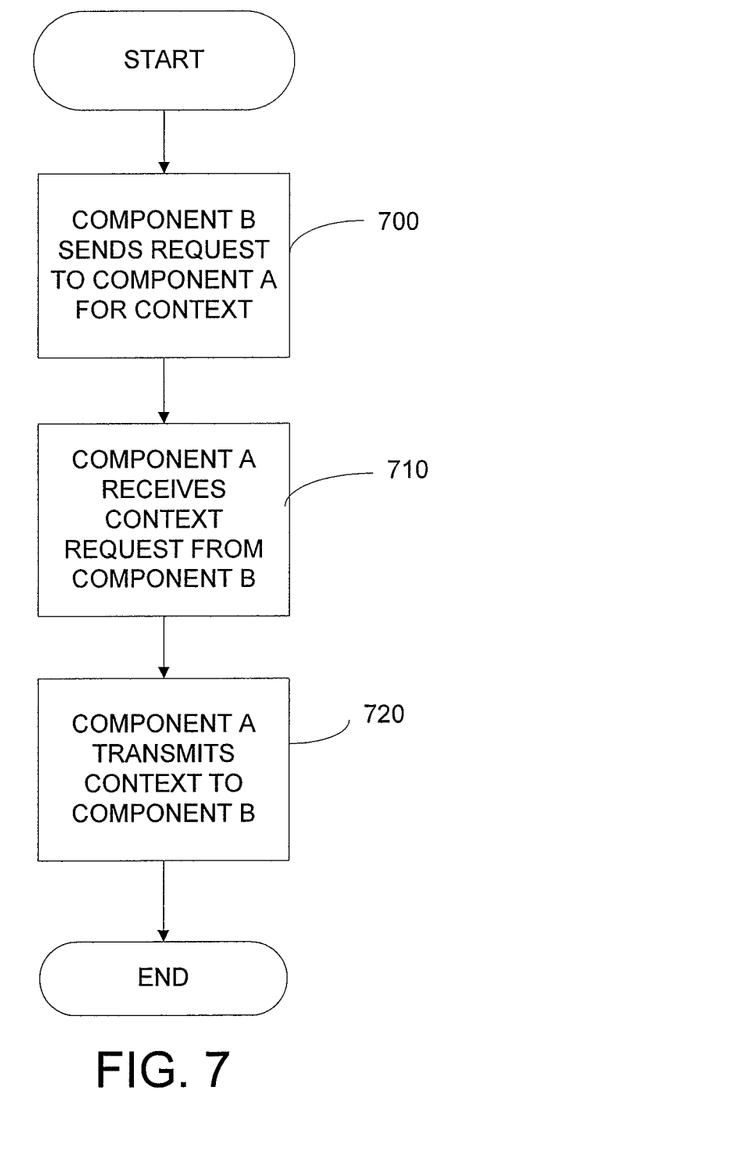
FIG. 7 is a flowchart of a process for transmitting context information from one component to another component according to an embodiment of the invention.

Various examples provided above refer to transmitting information related to a context from a first component to a second component, such that the context information is passed to a SwitchBranch in the second component in a passive manner. An alternative process for transmitting context information from a first component to a second component in accordance with any of the embodiments of the invention described above is shown in FIG. 7. Component B, upon being called by a component A, generates and sends a request for the context of component A at block 700. At block 710, component A receives the context request from component B, and at block 720 component A transmits its context to component B. In this case, component B may be an application component or a component of the operating system.

Context information may be transferred between components in a computer system using any suitable method, including those methods described above. For example, context may be transferred via one or more remote procedure calls (RPCs) between components in user mode, or one or more kernel traps between components in the kernel mode. Application context information may also be associated with a process executing the application component and the context information may be passed to another component via the executing process. Alternatively, context information may be transferred between components via subprocesses that are inherited from one component to another component. The above mentioned ways in which a context may be transferred between components are merely exemplary, and it should be appreciated that any other suitable way of transferring context information between components may also be used.

In one embodiment, isolated SwitchBranch implementations can be packaged into separate DLLs, with only some of the DLLs being installed along-side the operating system software by default. For example, implementations of old versions of an operating system may be made available as supplementary materials provided with a purchase of software for a newer version of the operating system, or alternatively, they may be made available online for a user to download. In some implementations, when a user executes an application that requires one or more DLLs containing SwitchBranches, the appropriate files may be located, downloaded, and installed on demand.

In one embodiment, a SwitchBranch may be implemented in the operating system of a computer by a DLL, and the SwitchBranch may be detected by reading SwitchBranch information stored in the DLL that implements it. For example, a section of the SwitchBranch information may contain pointers to information in an application manifest and/or pointers to the actual SwitchBranches that are implemented. In some implementations, multiple application manifests may be combined in a single DLL and a section of the SwitchBranch information may contain all of the application manifest information. Iterative methods may be employed to retrieve the information for each application manifest when multiple manifests are present in a single DLL.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable memory having a plurality of computer executable modules for supporting execution of a component on a computer stored therein, the computer executable modules comprising:

a detector module configured to detect a context for the component and to perform dynamic run-time adjustments to the detected context; and a platform module configured to provide a platform that supports the execution of the component by performing operations selected from a plurality of operations in response to requests from the component, the platform comprising:

a branch component configured to select a particular operation from the plurality of operations in response to a particular request from the component for a functionality provided by the platform, wherein the branch component is further configured to select the particular operation based at least in part on the detected and dynamically run-time adjusted context.

2. The computer-readable memory of claim 1, wherein the branch component comprises at least one reporting module configured to record states of events on the computer.

3. The computer-readable memory of claim 1, wherein the branch component comprises at least one logging module configured to store information related to states of events on the computer.

4. The computer-readable memory of claim 3, wherein the at least one logging module is further configured to store the information in at least one of a file, a registry, and a memory buffer.

5. The computer-readable memory of claim 1, wherein the platform corresponds to a version of a computer operating system.

6. The computer-readable memory of claim 1, wherein the detector module is further configured to detect the context by searching metadata associated with the component for an indicator of the context.

7. The computer-readable memory of claim 6, wherein the metadata is included in an XML file.

8. A method of facilitating software compatibility across a plurality of contexts in a computer operating system executing on a computing device, the method comprising:

executing an application, wherein executing the application comprises:

dynamically run-time adjusting a context associated with the application;

invoking a component of the computer operating system to perform an operation requested by the executing application; and executing the component to service the operation requested by the executing application, wherein executing the component includes:

selecting, by a branch selection component of the component, a function from amongst a plurality of functions to perform at least part of the requested operation based at least in part on the dynamically run-time adjusted context; and executing the selected function.

9. The method of claim 8, wherein the selected function facilitates execution of the application.

10. The method of claim 8, wherein the context indicates a platform that the application is designed to execute on.

11. The method of claim 8, wherein the branch selection component is configured to prevent at least one other application from invoking the component.

12. The method of claim 8, wherein selecting the function comprises determining a mapping between the function and a series of computer executable instructions for providing a desired behavior.

13. The method of claim 12, wherein determining the mapping comprises searching a file associated with a platform for the mapping.

14. The method of claim 8, wherein the branch selection component is requested and loaded from a supplementary source while executing the application.

15. A method of operating a computer to execute an application, comprising:
- determining, based at least in part on metadata associated with the application, a context for executing the application;
- performing a dynamic run-time adjustment of the determined context; and
- employing, by a branch selection component of a platform operating on the computer, the determined and dynamically run-time adjusted context in selecting an operation from a plurality of operations in response to a request from the application for a functionality provided by the platform.

16. The method of claim 15, further comprising:
- receiving a request from the platform for the determined and dynamically run-time adjusted context; and
- in response to the request, providing an indication of the determined and dynamically run-time adjusted context to the platform.

17. The method of claim 16, wherein the context is determined based at least in part on information related to one or more versions of the platform on which the application is executed.

18. The method of claim 15, wherein the context is determined based at least in part on information indicating a subsystem major/minor version.

19. The method of claim 18, wherein the subsystem major/minor version is indicated as header information associated with the application.

20. The method of claim 15, wherein the platform is different than an operating system of the computer.

* * * * *